United States Patent
Tyagi

(10) Patent No.: US 9,680,832 B1
(45) Date of Patent: Jun. 13, 2017

(54) USING A PROBABILITY-BASED MODEL TO DETECT RANDOM CONTENT IN A PROTOCOL FIELD ASSOCIATED WITH NETWORK TRAFFIC

(71) Applicant: Juniper Networks, Inc., Sunnyvale, CA (US)

(72) Inventor: Ankur Tyagi, Surat (IN)

(73) Assignee: Juniper Networks, Inc., Sunnyvale, CA (US)

(*) Notice: Subject to any disclaimer, the term of this patent is extended or adjusted under 35 U.S.C. 154(b) by 262 days.

(21) Appl. No.: 14/586,144

(22) Filed: Dec. 30, 2014

(51) Int. Cl.
H04L 29/00 (2006.01)
H04L 29/06 (2006.01)

(52) U.S. Cl.
CPC .............. H04L 63/10 (2013.01); H04L 63/14 (2013.01)

(58) Field of Classification Search
CPC ........... G06F 17/30; G06F 15/16; G06F 17/00
See application file for complete search history.

(56) References Cited

U.S. PATENT DOCUMENTS 7,844,683 B2 * 11/2010 Peiffer .................... H04L 29/06 709/217
8,356,001 B2   1/2013 Collazo
2009/0328185 A1  12/2009 Berg et al.
2011/0013511 A1   1/2011 Li et al.
2012/0166483 A1 *  6/2012 Choudhary ....... G06F 17/30545 707/770

OTHER PUBLICATIONS

Wikipedia, "Hypertext Transfer Protocol," http://en.wikipedia.org/wiki/Hypertext_Transfer_Protocol, Dec. 27, 2014, 12 pages.
Wikipedia, "Markov chain," http://en.wikipedia.org/wiki/Markov_chain, Dec. 5, 2014, 24 pages.
Wikipedia, "n-gram," http://en.wikipedia.org/wiki/N-gram, Dec. 11, 2014, 9 pages.

* cited by examiner

*Primary Examiner* — Anthony Brown
*Assistant Examiner* — Michael D Anderson
(74) *Attorney, Agent, or Firm* — Harrity & Harrity, LLP

(57) ABSTRACT

A device may receive network traffic. The device may identify candidate text included in a protocol field associated with the network traffic. The device may identify a set of candidate strings included in the candidate text. The device may identify a set of characters that precedes or follows a candidate string, of the set of candidate strings, in the candidate text. The device may determine, using a data structure, a frequency with which the set of characters precedes or follows the candidate string. The device may determine whether the candidate text includes random text based on the frequency. The device may perform an action on the network traffic based on determining whether the candidate text includes random text.

20 Claims, 9 Drawing Sheets

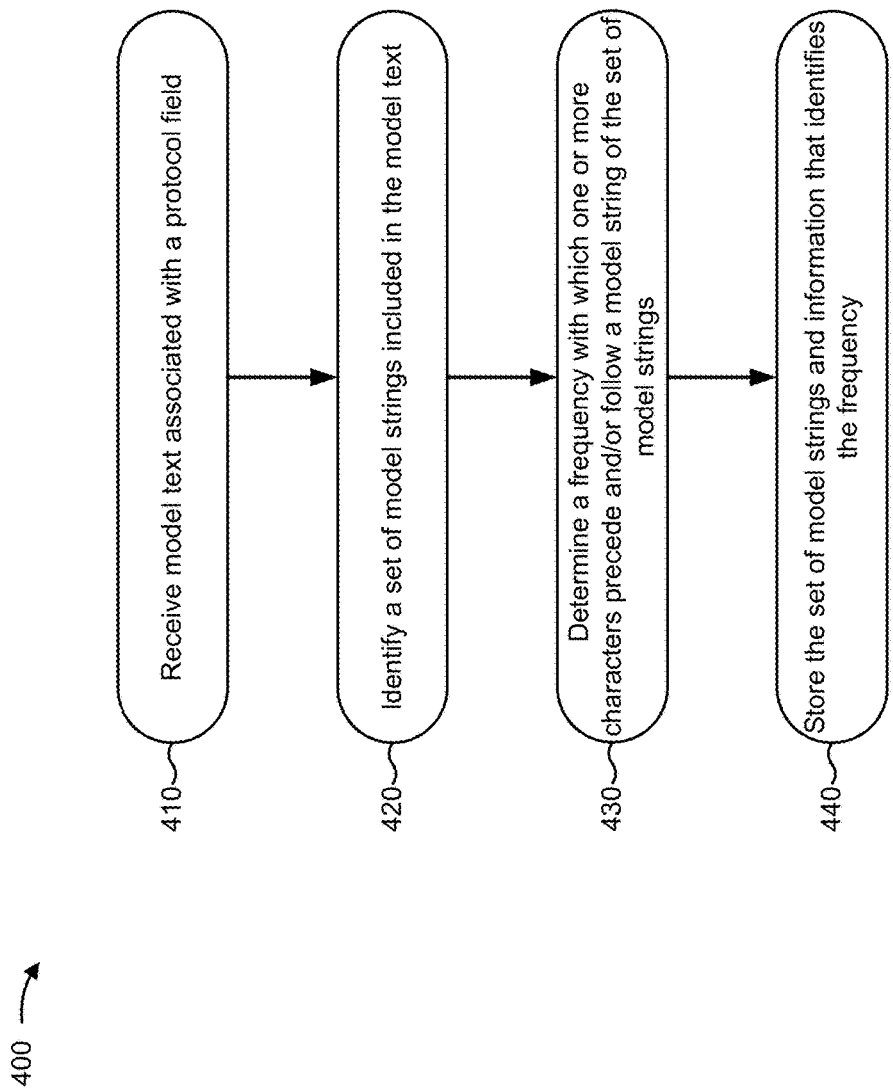

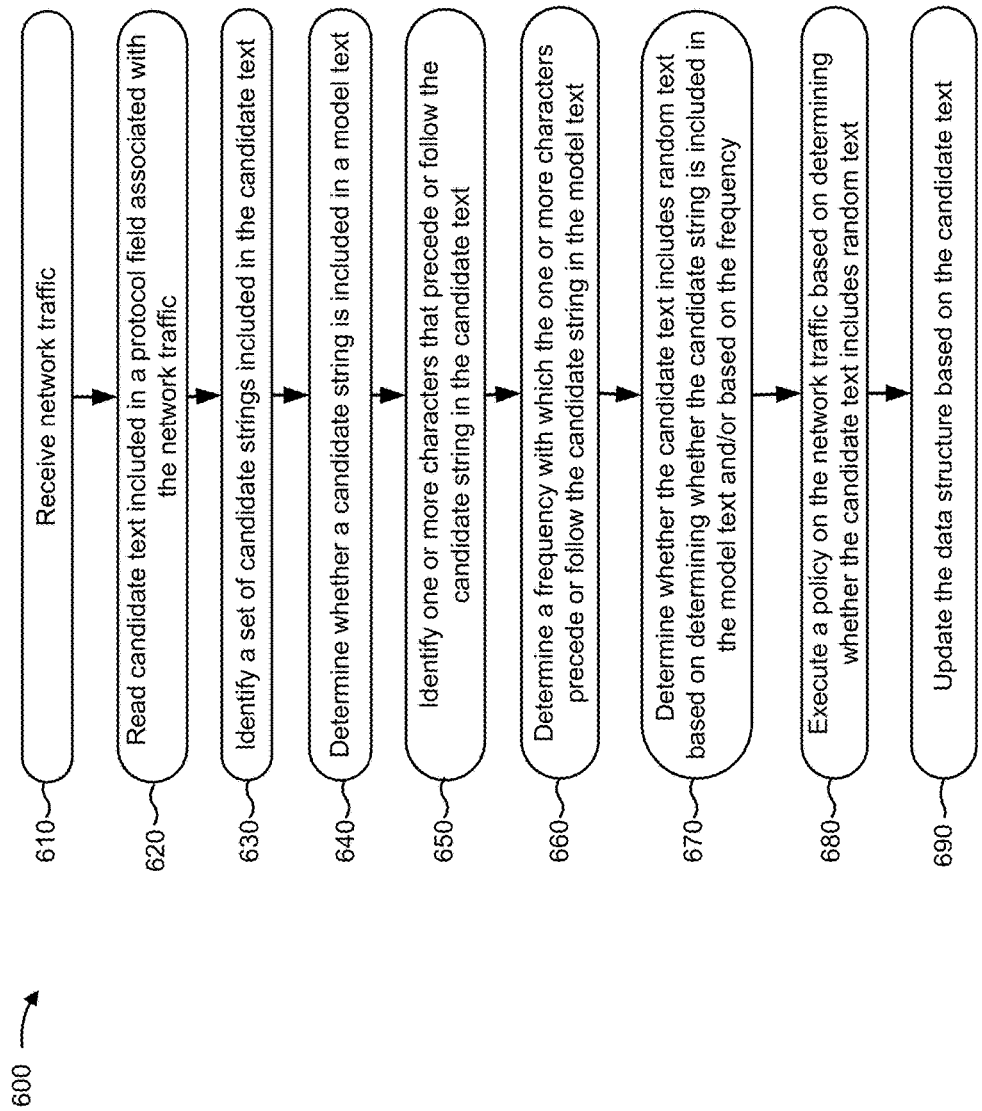

USING A PROBABILITY-BASED MODEL TO DETECT RANDOM CONTENT IN A PROTOCOL FIELD ASSOCIATED WITH NETWORK TRAFFIC

BACKGROUND

Network traffic may be associated with a protocol (e.g., a communications protocol, an application protocol, or the like) that may assist in the exchange of network traffic between devices within a network. The protocol may include a set of rules governing the exchange of network traffic. A field for the protocol (e.g., a protocol field such as a Hypertext Transfer Protocol (HTTP) host field, a Domain Name System (DNS) name field, a Simple Mail Transfer Protocol (SMTP) banner field, or the like) may include a string, a number, or the like.

SUMMARY

According to some possible implementations, a device may include one or more processors. The one or more processors may receive network traffic. The one or more processors may identify candidate text included in a communication protocol field associated with the network traffic. The one or more processors may identify a set of candidate strings included in the candidate text. The one or more processors may determine whether a candidate string, of the set of candidate strings, matches a model string. The model string may be included in a model text associated with the communication protocol field. The model text may be stored in a data structure. The one or more processors may identify a set of characters that precedes or follows the candidate string in the candidate text. The one or more processors may determine, using the data structure, a frequency with which the set of characters precedes or follows the candidate string. The one or more processors may determine whether the candidate text includes random text based on determining whether the candidate string matches the model string or based on the frequency. The one or more processors may execute a policy to perform an action on the network traffic based on determining whether the candidate text includes random text.

According to some possible implementations, a method may include receiving, by a device, network traffic. The method may include identifying, by the device, candidate text included in a communication protocol field associated with the network traffic. The method may include identifying, by the device, a set of candidate strings included in the candidate text. The method may include determining, by the device, whether a candidate string, of the set of candidate strings, is included in a data structure. The data structure may store model text associated with the communication protocol field. The method may include identifying, by the device, a set of characters that precedes or follows the candidate string in the candidate text. The method may include determining, by the device and using the data structure, a frequency with which the set of characters precedes or follows the candidate string. The method may include determining, by the device, whether the candidate text includes random text based on determining whether the candidate string is included in the data structure or based on the frequency. The method may include performing, by the device, an action on the network traffic based on determining whether the candidate text includes random text.

According to some possible implementations, a computer-readable medium may store instructions, that when executed by a processor, may cause the processor to receive network traffic. The instructions may cause the processor to identify candidate text included in a protocol field associated with the network traffic. The instructions may cause the processor to identify a set of candidate strings included in the candidate text. The instructions may cause the processor to identify a set of characters that precedes or follows a candidate string, of the set of candidate strings, in the candidate text. The instructions may cause the processor to determine, using a data structure, a frequency with which the set of characters precedes or follows the candidate string. The instructions may cause the processor to determine whether the candidate text includes random text based on the frequency. The instructions may cause the processor to perform an action on the network traffic based on determining whether the candidate text includes random text.

BRIEF DESCRIPTION OF THE DRAWINGS

FIG. 4 is a flow chart of an example process for creating a data structure that may be used by a probability-based model that is used to detect random content in a protocol field associated with network traffic;

FIG. 6 is a flow chart of an example process for classifying and/or routing network traffic using the probability-based model that detects random content in the protocol field associated with the network traffic.

DETAILED DESCRIPTION

The following detailed description of example implementations refers to the accompanying drawings. The same reference numbers in different drawings may identify the same or similar elements.

A network security device (e.g., a router, a switch, a filter, a server, or the like) may receive network traffic that is malicious and/or network traffic that is benign. Malicious network traffic may include network traffic sent by an attacker. Benign network traffic may include network traffic sent by a client. A server device may include a computing device, such as a server, a desktop computer, or the like.

Before routing the network traffic to the server device, the network security device may classify and/or filter the network traffic, based on the network traffic being benign or malicious, in order to protect the server device from malicious network traffic. But, classifying and/or filtering the network traffic in an accurate manner may be difficult because of evolving network threats and because of attackers using algorithms that generate random strings to produce a high volume of attacks.

Implementations described herein may assist in classifying network traffic as benign or malicious using a probability-based model (e.g., sometimes referred to herein as a model) to detect random content in a protocol field associated with the network traffic. Implementations described herein may improve accuracy of classification by training the model using a large amount of model text, may enable detection of evolving network threats by training the model using live network traffic, and may improve the efficiency of the classification process by using an efficient Markov chain process. The model that detects random content in a protocol field may be used to classify network traffic because a protocol field associated with malicious network traffic may include a random string, whereas a protocol field associated with benign network traffic may not include a random string.

Figure 1:
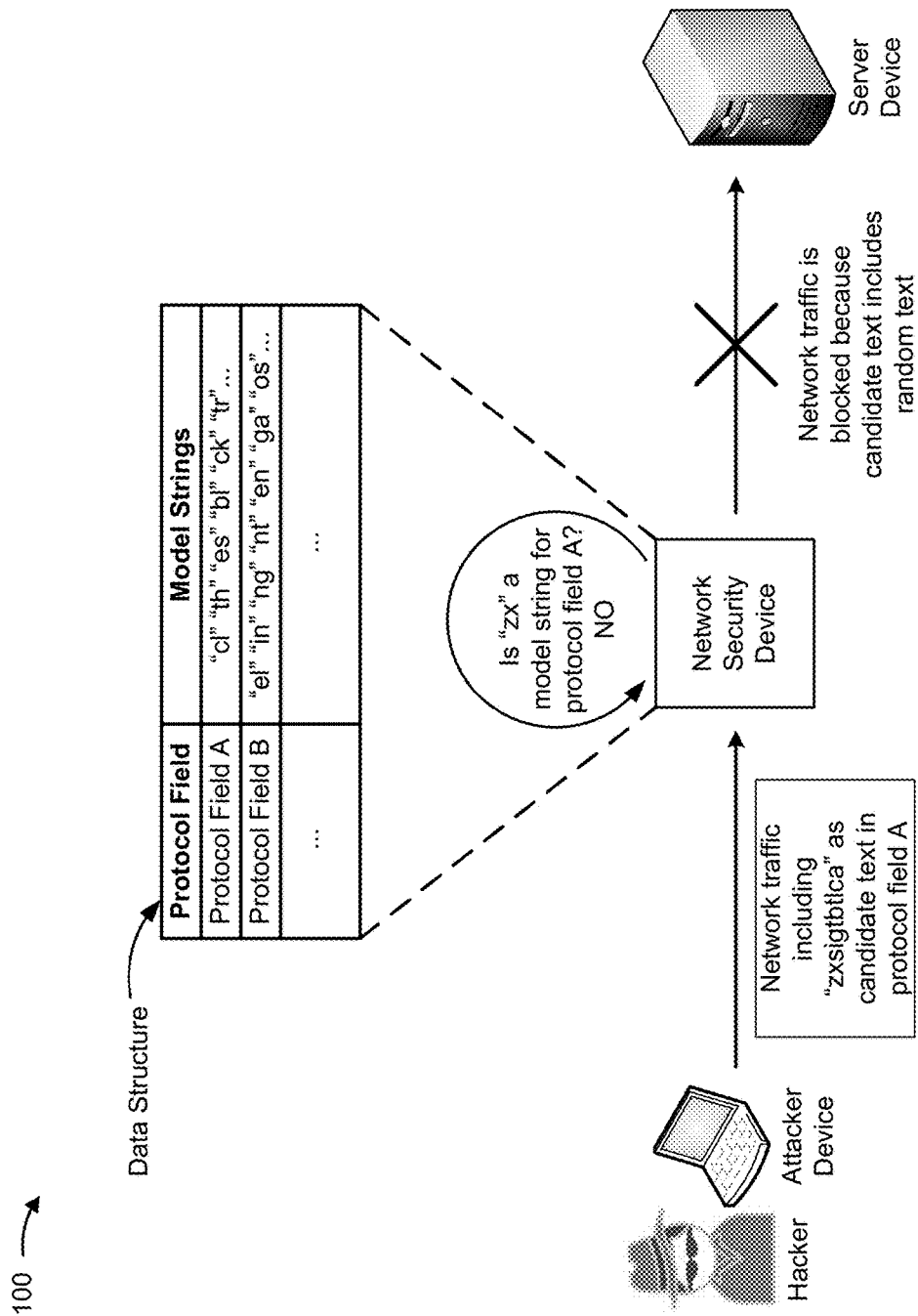
FIG. 1 is a diagram of an overview of an example implementation described herein.

FIG. 1 is a diagram of an overview of an example implementation 100 described herein. Assume that example implementation 100 includes a server device, a network security device, an attacker device (e.g., a computing device such as a desktop computer, a laptop, or the like, that may be a source of malicious network traffic), and a data structure stored by the network security device. Assume further that the network security device is in communication with the attacker device, and that the network security device is in communication with the server device.

As shown in FIG. 1, the data structure may include a set of model strings associated with a protocol field. A model string may refer to a string included in model text. Model text may include initial text that may be input to the network security device to train the model with respect to a protocol field. Different model text may be input to the network security device depending on the protocol field. Assume that the network security device has identified model strings included in the model text and that the model strings are two characters in length.

As shown, a hacker may provide an instruction to the attacker device to provide network traffic to the server device. The network security device may receive the network traffic from the attacker device. The network security device may determine that protocol field A, associated with the network traffic, includes candidate text "zxsigtbtlca" (e.g., "zxsigtbtlca" is the candidate text that is to be tested using the model). The network security device may identify a set of candidate strings that are included in the candidate text (e.g., zx, xs, si, ig, etc.). For example implementation 100, assume that the model strings and the candidate strings are two characters in length. The network security device may determine whether a candidate string, of the set of candidate strings, is included in the model text. That is, the network security device may determine, using the data structure, whether the candidate string matches a model string included in the model text (e.g., whether a model string stored in the data structure matches the candidate string).

As shown, the network security device may determine, using the data structure, that "zx," a candidate string formed by the first two characters of the candidate text, is not included in the model text (e.g., "zx" does not match a model string stored in the data structure). The network security device may determine whether the other candidate strings included in "zxsigbtlca" match a model string. The network security device may determine that no candidate string matches a model string. Based on the fact that no candidate string matches a model string, the network security device may determine, using a probability-based model (e.g., a model that considers something probable if a threshold probability, calculated based on the data structure, is satisfied), that the candidate text in protocol field A probably contains random text. Since random text is usually found in protocol fields of malicious network traffic, the network security device may classify the network traffic as malicious and may block the network traffic from reaching the server device.

The network security device may determine that a candidate text includes random text using another process (not shown), such as by determining, using a data structure, a frequency with which one or more characters precede or follow the candidate string. To determine the frequency, the network security device may identify one or more characters that precede or follow the candidate string in the candidate text (e.g., the network security device may identify that in the candidate text "this," the character "i" follows the candidate string "th" (not shown)). The network security device may, using the data structure, determine the frequency with which the one or more characters precede or follow the candidate string in the model text (e.g., the frequency of "i" following "th" may be 30%). The network security device may, using the model, determine whether the frequency satisfies a threshold (e.g., whether the frequency is below 10%). The network security device may, using the model, determine that the candidate text does not include random text (e.g., the network traffic associated with the candidate text is benign) because the frequency satisfies does not satisfy a threshold (e.g., 30% is not below 10%).

In this way, a network security device may assist in classifying network traffic as benign or malicious based on using a data structure to assist a probability-based model in detecting random content in a protocol field.

Figure 2:
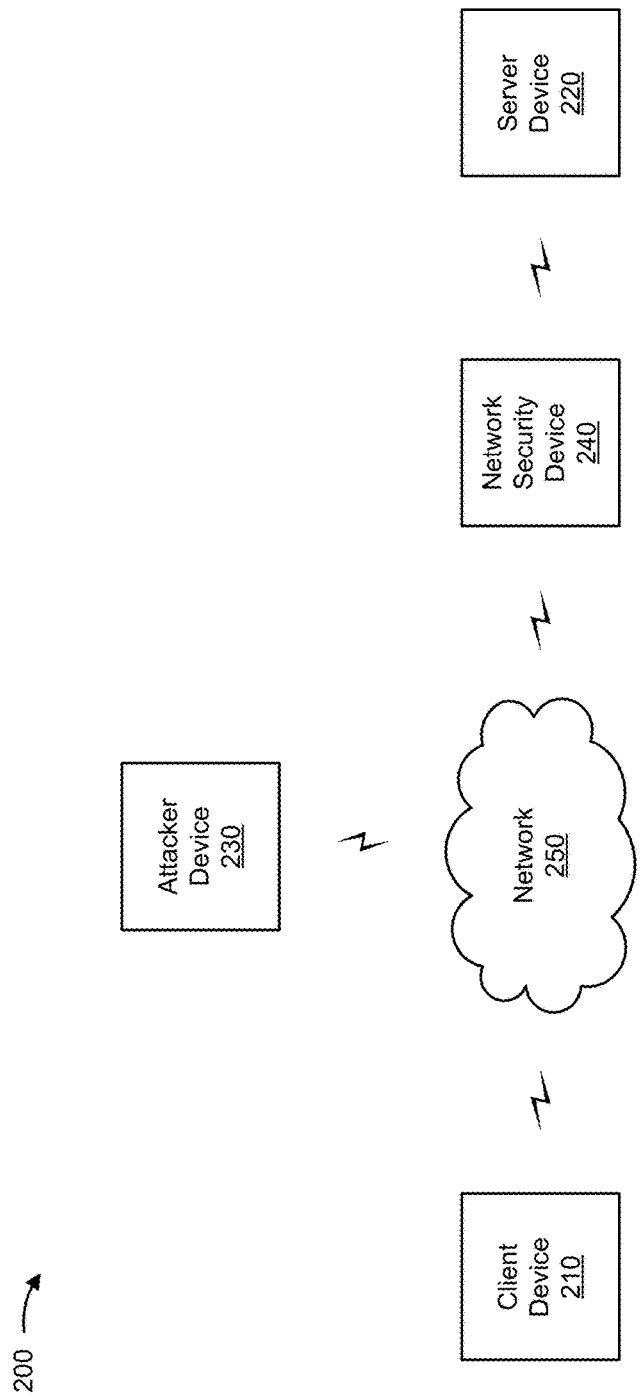
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, an attacker device 230, a network security device 240, and a network 250. Devices of environment 200 may interconnect via wired connections, wireless connections, or a combination of wired and wireless connections.

Client device 210 may include one or more devices capable of providing and/or receiving network traffic via network 250. For example, client device 210 may include a computing device, such as a laptop computer, a tablet computer, a handheld computer, a desktop computer, a mobile phone (e.g., a smart phone, a radiotelephone, etc.), or a similar device. In some implementations, client device 210 may provide benign network traffic intended for server device 220, which may be intercepted by network security device 240 and routed by network security device 240 to server device 220.

Server device 220 may include one or more devices capable of receiving and/or providing network traffic via network 250 and/or via network security device 240. For example, server device 220 may include a computing device, such as a server (e.g., an application server, a content server, a host server, a web server, an e-mail server, etc.), a desktop computer, a laptop computer, or a similar device. In some implementations, server device 220 may receive, via network 250 and network security device 240, benign network traffic that originates from client device 210.

Attacker device 230 may include one or more devices capable of providing and/or receiving network traffic via network 250. For example, attacker device 230 may include a computing device, such as a laptop computer, a tablet computer, a handheld computer, a desktop computer, a mobile phone (e.g., a smart phone, a radiotelephone, etc.), or a similar device. In some implementations, attacker device 230 may provide malicious network traffic intended for server device 220, which may be intercepted by network security device 240 and dropped by network security device 240. In some implementations, a hacker may use attacker device 230 to send and/or route malicious network traffic intended for server device 220. Additionally, or alternatively, a typical, non-malicious user may unwittingly use attacker device 230 (e.g., because a device used by the user has been hacked or infected with malicious software that sends and/or routes malicious network traffic intended for server device 220).

Network security device 240 may include one or more devices capable of receiving, storing, processing, and/or providing network traffic. For example, network security device 240 may include a network device, such as a reverse proxy, a server (e.g., a proxy server), a traffic transfer device, a firewall, a router, a switch, an intrusion detection device, a gateway, a hub, a load balancer, or the like. In some implementations, network security device 240 may receive network traffic originating from client device 210, may classify the network traffic originating from client device 210 as benign, and may route the network traffic to server device 220. Additionally, or alternatively, network security device 240 may receive network traffic originating from attacker device 230, may classify the network traffic originating from attacker device 230 as malicious, and may drop the network traffic before the network traffic reaches server device 220.

In some implementations, network security device 240 may be used in connection with a single server device 220 or a set of server devices 220 (e.g., associated with a data center, a private network, etc). Additionally, or alternatively, network traffic may be routed through network security device 240 to reach the one or more server devices 220. For example, network security device 240 may be positioned within network 250 as a gateway to a private network that includes one or more server devices 220.

Network 250 may include one or more wired and/or wireless networks. For example, network 250 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
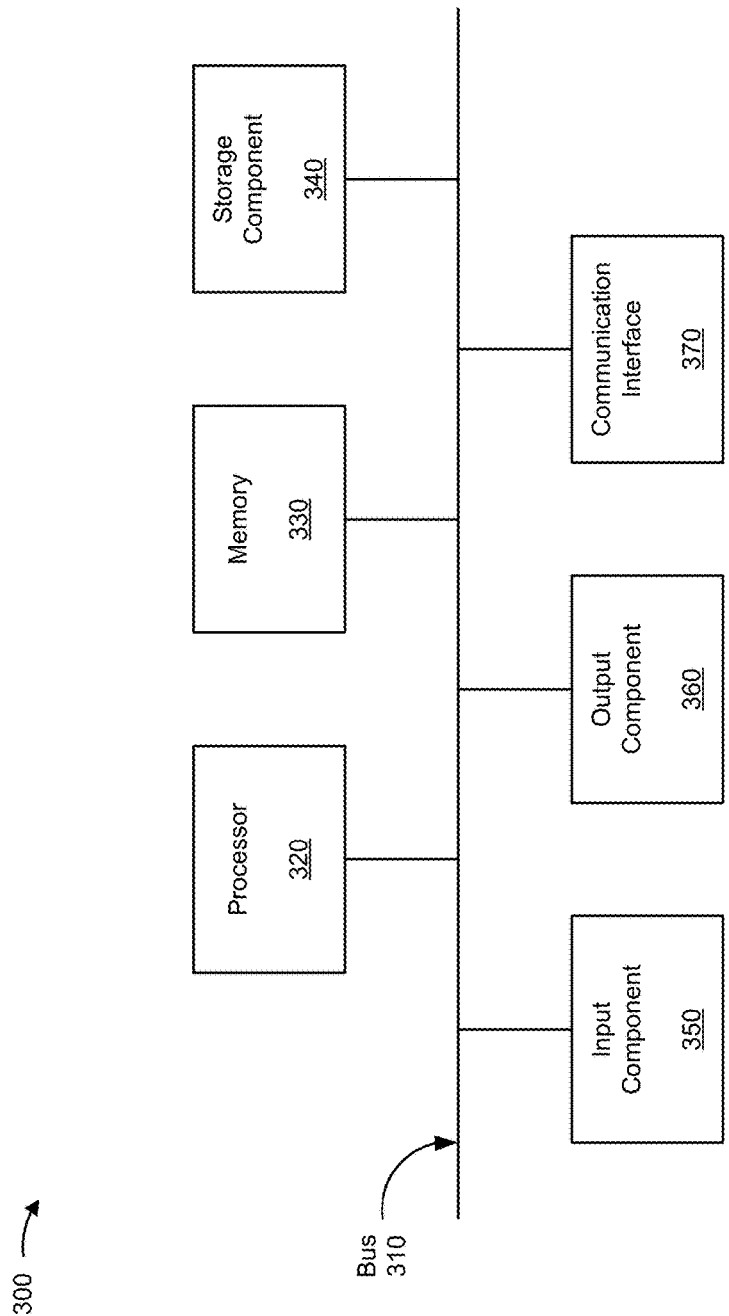
FIG. 3 is a diagram of example components of one or more devices of FIG. 2.

FIG. 3 is a diagram of example components of a device 300. Device 300 may correspond to client device 210, server device 220, attacker device 230, and/or network security device 240. In some implementations, client device 210, server device 220, attacker device 230, and/or network security device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for creating a data structure that may be used by a probability-based model that is used to detect random content in a protocol field associated with network traffic. In some implementations, one or more process blocks of FIG. 4 may be performed by network security device 240. In some implementations, one or more process blocks of FIG. 4 may be performed by another device or a set of devices separate from or including network security device 240, such as client device 210 and/or server device 220.

As shown in FIG. 4, process 400 may include receiving model text associated with a protocol field (block 410). For example, network security device 240 may receive model text associated with a protocol field. In some implementations, an input device (e.g., a desktop computer, a laptop, or the like) may provide model text associated with the protocol field to network security device 240. In some implementations, the input device may provide, to network security device 240, model text that is a character string of any length that is representative of typical text entries in the protocol field found in benign network traffic. For example, model text associated with the protocol field may include English-language text if the protocol field is normally populated with English language text (e.g., in typical or benign network traffic). Additionally, or alternatively, network security device 240 may receive full text of English-language works that are representative of typical English words (e.g., English-language novels, English-language biographies, English-language dictionaries, English language news articles, or the like). In some implementations, network security device 240 may receive different model text for different protocol fields. Additionally, or alternatively, network security device 240 may receive identical model text for different protocol fields.

In some implementations, the protocol field may be a field included in a network packet protocol associated with a particular protocol, such as Hypertext Transfer Protocol (HTTP), File Transfer Protocol (FTP), Simple Mail Transfer Protocol (SMTP), Internet Message Access Protocol (IMAP), Post Office Protocol third version (POP3), Server Message Block (SMB) protocol, Domain Name System (DNS), or the like.

In some implementations, network security device 240 may receive model text from a protocol field of live network deployments. For example, network security device 240 may receive, directly or via another device, text entries included in the protocol field of live network traffic (e.g., network traffic transmitted via network 250 or some other network). In such an implementation, the text entries included in the protocol field of live network traffic may assist network security device 240 in creating a context-aware probability-based model for detecting random content (e.g., the accuracy of the model is better when the model text is a better representation of text usually found in the protocol field). In some implementations, network security device 240 may receive model text that includes numbers, symbols, and/or non-English language text if the associated protocol field is normally populated with numbers, symbols, and/or non-English language text. Additionally, or alternatively, network security device 240 may receive model text that includes millions or billions of examples of text entries that are representative of the protocol field.

As further shown in FIG. 4, process 400 may include identifying a set of model strings included in the model text (block 420). For example, network security device 240 may identify a set of model strings included in the model text. In some implementations, network security device 240 may identify a set of model strings in the model text based on using an n-gram sequence. An n-gram sequence may include a contiguous sequence of characters collected from a given text. A bigram may refer to an n-gram that is two characters in length. For example, the bigram sequence for "zxsigtbtlca" may include "zx," "xs," "si," "ig," "gt," "tb," "bt," "tl," "lc," and "ca." In some implementations, network security device 240 may identify a set of model strings that include a bigram sequence identified from the model text. For example, the model text may be "zxsigtbtlca" and the set of model strings identified in the model text by network security device 240 may include "zx," "xs," "si," "ig," "gt," "tb," "bt," "tl," "lc," and "ca." Additionally, or alternatively, network security device 240 may identify a set of model strings that include a different quantity of characters (e.g., 3 characters, 4 characters, etc.).

As further shown in FIG. 4, process 400 may include determining a frequency with which one or more characters precede and/or follow a model string of the set of model strings (block 430). For example, network security device 240 may determine a frequency with which one or more characters precede or follow a model string of the set of model strings. In some implementations, network security device 240 may determine a frequency with which one or more characters precede a model string in the model text. Additionally, or alternatively, network security device 240 may determine a frequency with which one or more characters follow a model string in the model text. In some implementations, the frequency may be represented as a percentage (e.g., the percentage of times the one or more characters precede and/or follow a model string out of the quantity of times the model string appears in the model text). Additionally, or alternatively, the frequency may be represented as a quantity.

For example, network security device 240 may determine the frequency with which one or more characters precede or follow the model string "th" that may be included in a set of model strings (e.g., the model text may include the word "this"). Network security device 240 may determine the frequency with which the character "i" follows the model string "th" (e.g., the frequency may be 30% because "i" may follow "th" three out of the ten times "th" appears in the model text). Network security device 240 may determine the frequency with which the character "i" precedes the model string "th" (e.g., the frequency may be 10% because "i" may precede "th" one out of the ten times "th" appears in the model text).

In some implementations, network security device 240 may determine frequencies with respect to each model string in the model text. In some implementations, network security device 240 may be configured to automatically update frequencies when network security device 240 receives additional text to add to the model text. Network security device 240 may automatically update frequencies by determining frequencies with respect to a new set of model strings that are included in an updated model text (e.g., determining frequencies in the same manner network security device 240 determined the frequency of "i" preceding or following the model string "th").

In some implementations, network security device 240 may determine the frequency based on a Markov chain process where a probability of a next state of a system (e.g., a probability that a character follows a two-character string) may be dependent only on the current state of the system, without regard to previous states of the system (e.g., may be dependent only on the two-character string itself, without regard to characters that precede the two-character string). In some implementations, the probability-based model, used to determine whether text included in a protocol field of network traffic is random, may use frequencies determined based on the Markov chain process.

In some implementations, the model that uses frequencies based on the Markov chain process may be relatively energy efficient and efficient in terms of processing power use, as compared to a model that uses frequencies that take into account previous states of the system (e.g., characters that precede the two-character string). Additionally, or alternatively, the model that uses frequencies based on the Markov chain process may be easily scalable (e.g., by using a trigram or a four-gram sequence instead of a bigram sequence in order to take into account more context of a text included in a protocol field). For example, the trigram sequence for "zxsigtbtlca" may include "zxs," "xsi," "sig," "igt," and so on.

Additionally, or alternatively, network security device 240 may determine a different frequency for different protocol fields (e.g., because different protocol fields may be associated with different model text). In some implementations, network security device 240 may determine a same frequency for different protocol fields (e.g., because different protocol fields may be associated with identical model text).

As further shown in FIG. 4, process 400 may include storing the set of model strings and information that identifies the frequency (block 440). For example, network security device 240 may store the set of model strings and information that identifies one or more frequencies with which one or more characters precede and/or follow a set of model strings. In some implementations, network security device 240 may store the frequencies in a data structure that may be used by network security device 240 in the operation of the model used to detect random content in a protocol field associated with network traffic (as described below in connection with FIG. 6). In this way, network security device 240 may create a data structure that may be used by the model that is used to detect random content in a protocol field associated with network traffic, in order to classify the network traffic as benign or malicious.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
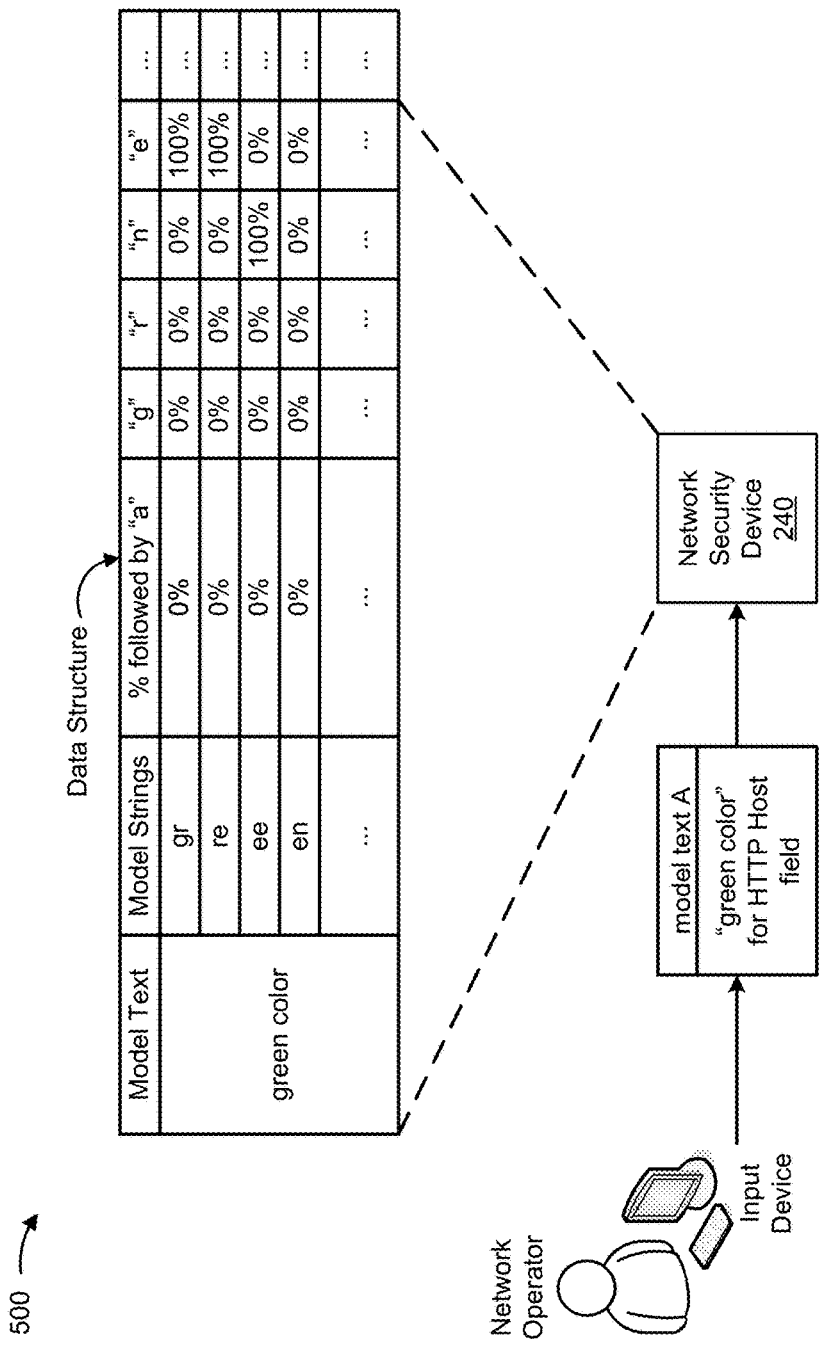
FIGS. 5A and 5B are diagrams of an example implementation relating to the example process shown in FIG. 4.
Figure 5B:
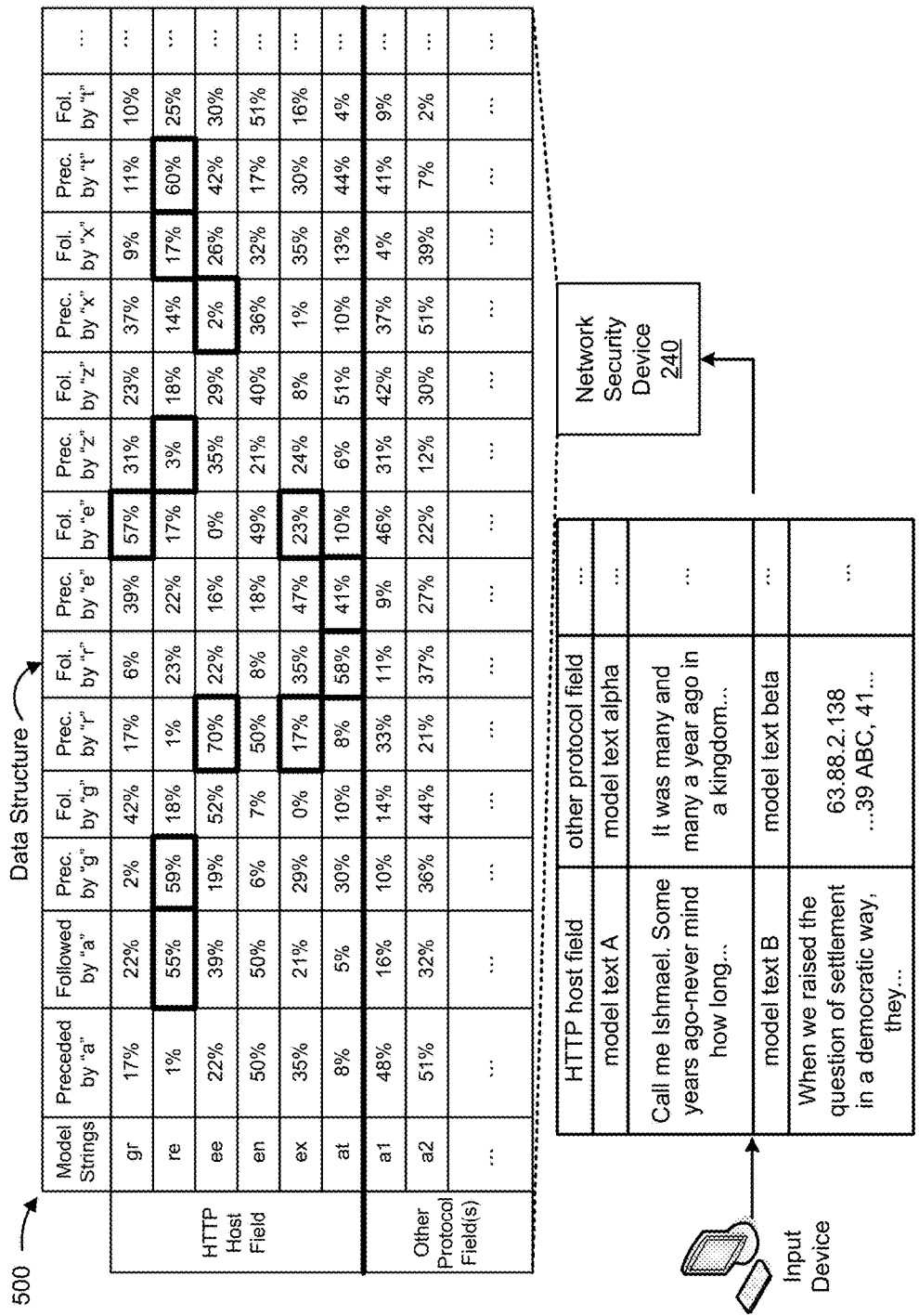

FIGS. 5A and 5B are diagrams of an example implementation 500 relating to example process 400 shown in FIG. 4. FIGS. 5A and 5B show an example of creating a data structure that may be used by a probability-based model that is used to detect random content in a protocol field associated with network traffic.

As shown in FIG. 5A, assume that implementation 500 includes a network security device 240 and an input device (e.g., a desktop computer, a laptop computer, or the like). Assume further that network security device 240 is in communication with the input device.

As further shown, the input device may provide model text (e.g., shown as model text A) to network security device 240. As shown, a network operator may instruct the input device to provide the model text. As shown, the model text is associated with the HTTP host field. Network security device 240 receives model text A and identifies a set of model strings included in model text A. Assume that network security device 240 identifies the set of model strings included in the model text using a bigram sequence. Model Text A is "green color" and network security device 240 identifies a set of model strings that includes "gr," "re," "ee," "en," and so on.

Network security device 240 determines a frequency with which one or more characters follow a model string of the set of model strings. As shown in the data structure, network security device 240 determines that "e" follows the model string "gr" 100% of the time "gr" appears in model text A (e.g., "gr" is included in the model text only once and "e" follows "gr" at that point in model text A). Network security device 240 determines that "e" follows "re" 100% of the time "re" appears in model text A. Also, network security device 240 determines that "n" follows "ee" 100% of the time "ee" appears in model text A. Assume that network security device 240 determines the frequency with which one or more characters follow the other model strings included in "green color."

As shown, network security device 240 stores, in a data structure, the set of model strings and/or the information that identifies the frequency with which one or more characters follow a model string, of the set of model strings.

As shown in FIG. 5B, assume that network security device 240 receives additional model text from the input device. Network security device 240 receives several full text English-language works as model text for one or more protocol fields. For example, network security device 240 receives the text of an English-language novel (e.g., "Call me Ishmael. Some years . . . ") as model text for the HTTP host field (e.g., shown as model text A under the HTTP host field). Assume further that network security device 240 also receives model text, associated with the HTTP host field, from network traffic of a live network deployment (not shown). Assume further that network security device 240 identifies a set of model strings that includes strings included in model text of the HTTP host field, that includes strings included in model text of another protocol field, and so on. For example, network security device 240 may identify that model text A of the HTTP host field includes the following model strings: "Ca," "al," "ll," "l_," "_m," "me," and so on (e.g., an underscore represents a space).

As shown in the data structure, network security device 240 determines a frequency with which one or more characters precede or follow a model string of the set of model strings (e.g., with respect to a protocol field). Network security device 240 represents the frequency as a percentage (e.g., the percentages are represented as approximately ten times higher than typical frequency percentages observed in English language text for ease of reading and explanation). Certain frequencies listed in the data structure have been shaded with thicker lines to highlight these frequencies. These shaded frequencies may be used in examples of using a probability-based model to detect random content, as described below in connection with FIG. 7 and FIG. 8. As shown, network security device 240 determines that model string "re" is followed by the character "a" at a relatively high frequency of 55% (e.g., because many common English words, which may have been included in the model text, such as "great" and "treat" include a "rea" string). Network security device 240 determines that model string "ee" is preceded by "x" at a relatively low frequency of 2% (e.g., because there are not too many English words that include a string of "xee").

As shown, network security device 240 stores, in a data structure, the set of model strings included in the model text and/or the information that identifies the frequency with which one or more characters precede or follow a model string of the set of model strings.

As indicated above, FIGS. 5A and 5B are provided merely as an example. Other examples are possible and may differ from what was described with regard to FIGS. 5A and 5B.

FIG. 6 is a flow chart of an example process 600 for classifying and/or routing network traffic based on a probability-based model that detects random content in a protocol field associated with the network traffic. In some implementations, one or more process blocks of FIG. 6 may be performed by network security device 240. In some implementations, one or more process blocks of FIG. 6 may be performed by another device or a set of devices separate from or including network security device 240, such as client device 210 and/or server device 220.

As shown in FIG. 6, process 600 may include receiving network traffic (block 610). For example, network security device 240 may receive network traffic from client device 210 and/or attacker device 230. In some implementations, network security device 240 may receive and/or intercept network traffic intended for server device 220. In some implementations, network security device 240 may receive live network traffic via network 250 (e.g., network traffic originating from users or hackers via a network). Additionally, or alternatively, network security device 240 may receive network traffic as a part of a simulation that tests network resilience using a random-string generator (e.g., a random-string generator that populates protocol fields of simulated network traffic).

As further shown in FIG. 6, process 600 may include reading candidate text included in a protocol field associated with the network traffic (block 620). For example, network security device 240 may read candidate text included in a protocol field associated with the network traffic. Candidate text may include text entries in a protocol field of the network traffic. For example, the candidate text may include text included in the HTTP host field of the network traffic. In some implementations, network security device 240 may read candidate text included in a pre-configured list of protocol fields associated with the network traffic. Additionally, or alternatively, network security device 240 may receive the pre-configured list of protocol fields from an input device. In some implementations, the pre-configured list of protocol fields may include protocol fields that typically include English language words. Additionally, or alternatively, network security device 240 may use a protocol identification architecture (e.g., a set of rules that assist in selecting an appropriate protocol field) to identify a list of protocol fields from which to read candidate text.

In some implementations, network security device 240 may filter the candidate text through a black list of texts that are known to belong to malicious network traffic. For example, network security device 240 may drop the network traffic if the associated candidate text matches a text in the black list. In such a case, network security device 240 may not need to perform the rest of process 600 in order to classify network traffic as malicious or benign.

As further shown in FIG. 6, process 600 may include identifying a set of candidate strings included in the candidate text (block 630). For example, network security device 240 may identify a set of candidate strings included in the candidate text based on using an n-gram sequence. In some implementations, network security device 240 may identify a set of candidate strings based on using a bigram sequence (e.g., the candidate text "green" corresponds to a bigram sequence that includes "gr," "re," "ee," and so on). That is, each candidate string may be two characters in length. Additionally, or alternatively, network security device 240 may identify a set of candidate strings using a trigram sequence (e.g., the candidate text "green" corresponds to a trigram sequence that includes "gre," "ree," "een," and so on), a four-gram sequence, and so on.

As further shown in FIG. 6, process 600 may include determining whether a candidate string is included in a model text (block 640). For example, network security device 240 may determine whether a candidate string, of the set of candidate strings, is included in a model text that is associated with the protocol field. In some implementations, network security device 240 may look up the model text stored by the data structure (created and/or populated as described above in connection with process 400) to determine whether a candidate string is included in the model text. Additionally, or alternatively, network security device 240 may determine whether the candidate string is identified in the data structure. In some implementations, network security device 240 may look up the list of model strings stored by the data structure and determine whether a model string matches the candidate string.

As further shown in FIG. 6, process 600 may include identifying one or more characters that precede or follow the candidate string in the candidate text (block 650). For example, network security device 240 may identify one or more characters that precede or follow the candidate string in the candidate text. For example, network security device 240 may identify that the character "t" follows the candidate string "ea" (e.g., "ea" may be a candidate string identified from candidate text that includes the word "great"). Additionally, or alternatively, network security device 240 may identify that the character "r" precedes the candidate string "ea" (e.g., "ea" may be a candidate string identified from candidate text that includes the word "great"). In some implementations, network security device 240 may be configured to identify one or more characters that follow each candidate string in the candidate text. Additionally, or alternatively, network security device 240 may be configured to identify one or more characters that precede each candidate string in the candidate text.

As further shown in FIG. 6, process 600 may include determining a frequency with which the one or more characters precede or follow the candidate string in the model text (block 660). For example, network security device 240 may determine a frequency with which the one or more characters precede or follow the string in the model text. In some implementations, network security device 240 may look up a model string in the data structure that is identical to the candidate string. Additionally, or alternatively, network security device 240 may look up, in the data structure, the frequency with which the one or more characters follow the model string. For example, network security device 240 may determine, using the data structure, that the frequency with which "t" follows a model string "ea" is a particular percentage (e.g., 40%). Model string "ea" may be selected because the candidate string may be "ea." In this example, the frequency may be relatively high (compared to the frequency with which "y" follows "ea", for example) because the data structure may be associated with model text that includes many English words where "t" follows "ea" (e.g., words such as "great," "eat," "treat," "threat," etc.).

In some implementations, network security device 240 may read, in the data structure, the model text to look up the places in the model text where the candidate string is found and determine the frequency with which one or more characters follow the candidate string.

As further shown in FIG. 6, process 600 may include determining whether the candidate text includes random text based on determining whether the candidate string is included in the model text and/or based on the frequency (block 670). For example, network security device 240 may determine whether the candidate text includes random text based on determining whether the candidate string is included in the model text and/or based on the frequency. In some implementations, network security device 240 may utilize a probability-based model to determine the probability that the candidate text includes random text (e.g., based on whether the set of candidate strings is included in the model text and/or based on the frequency). Additionally, or alternatively, network security device 240 may determine whether the candidate text includes random text based on whether the probability of the candidate text including random text satisfies a threshold (e.g., a threshold probability). For example, network security device 240 may determine, using the model, that the candidate text includes random text because the probability of the candidate text including random text is above a threshold probability (e.g., 50%).

In some implementations, network security device 240 may determine whether the candidate text includes random text based on determining whether the candidate string is included in the model text. For example, network security device 240 may determine that the candidate text includes random text because the candidate string is not included in the model text. Additionally, or alternatively, network security device 240 may determine that the candidate text does not include random text (e.g., the candidate text is clean) because the candidate string is included in the model text. In some implementations, network security device 240 may determine whether the candidate text includes random text based on determining whether a threshold proportion of candidate strings (or a threshold amount of candidate strings) out of the set of candidate strings are included in the model text. For example, network security device 240 may determine that the candidate text includes random text if less than half the candidate strings are included in the model text.

In some implementations, to avoid the impact of typographic errors in the candidate text, network security device 240 may determine whether the candidate text includes random text based on a quantity of initial candidate strings (e.g., the first four or five candidate strings of a candidate text). In such an implementation, the impact of typographic errors may be avoided because even if a first candidate string of the candidate text includes a typographic error, the determination of whether the candidate text includes random text may not be affected because subsequent candidate strings, which may not include a typographic error, may correct the determination.

In some implementations, network security device 240 may determine whether the candidate text includes random text based on the frequency. Additionally, or alternatively, network security device 240 may determine whether candidate text includes random text based on the frequency only when network security device 240 is not able to determine, with sufficient certainty, whether candidate text includes random text based on determining whether the candidate string is included in the model text.

In some implementations, network security device 240 may determine whether the candidate text includes random text based on frequencies of one or more characters following one or more candidate strings of the candidate text. In some implementations, network security device 240 may determine the probability of the candidate text including random text based on whether the frequencies (or the sum of the frequencies or a proportion of the frequencies) corresponding to each candidate string satisfy a threshold (e.g., a threshold frequency). For example, network security device 240 may determine that the candidate text includes random text because the sum of frequencies is lower than a threshold. As another example, network security device 240 may determine that the candidate text includes random text because at least half the frequencies are below a threshold frequency.

In some implementations, network security device 240 may determine whether the candidate text includes random text based on a score determined by applying weights to multiple frequencies. For example, when determining the score, candidate strings from significant parts of the candidate text (e.g., significant parts of the protocol field) may be weighted more than candidate strings from less significant parts of the candidate text. For example, frequencies from the first half of the candidate text may be weighted twice as much as frequencies from the second half of the candidate text. In such an example, network security device 240 may determine a score of 50% if the first half of the candidate text had four frequencies of 60% each and the second half of the candidate text had four frequencies of 30% each (e.g., 4×60×2+4×30=600, 600/12=50).

In some implementations, network security device 240 may determine whether the candidate text includes random text based on determining whether the candidate string is included in the model text and based on the frequency. For example, network security device 240 may determine that the candidate text is clean (e.g., does not include random text) because a particular percentage (e.g., 80%) of the candidate strings are included in the model text and frequencies associated with the candidate strings included in the model text are above a threshold frequency (e.g., 35%).

In some implementations, network security device 240 may receive instructions from an input device that specifies threshold frequencies, threshold sums of frequencies, threshold proportion of frequencies, threshold proportion of frequencies that are above a threshold frequency, scores, and/or threshold probabilities to be used by network security device 240 when determining whether candidate text includes random text.

As further shown in FIG. 6, process 600 may include executing a policy on the network traffic based on determining whether the candidate text includes random text (block 680). For example, network security device 240 may execute a policy on the network traffic based on determining whether the candidate text includes random text. In some implementations, random text in candidate text may be an indication of a protocol field that is associated with malicious network traffic, whereas the absence of random text in candidate text may be an indication of a protocol field that is associated with benign network traffic. In some implementations, network security device 240 may drop network traffic that is associated with candidate text that includes random text (e.g., may block the network traffic from accessing server device 220). Additionally, or alternatively, network security device 240 may allow network traffic, associated with candidate text that does not include random text, to be sent to server device 220.

In some implementations, network security device 240 may monitor a proportion of network traffic that is malicious and/or store the proportion. In some implementations, network security device 240 may analyze and/or display the proportion. Additionally, or alternatively, network security device 240 may send a duplicate of the proportion to another device for storage and/or analysis.

In some implementations, network security device 240 may execute a policy based on determining whether candidate text from several different protocol fields, associated with the network traffic, includes random text. Additionally, or alternatively, network security device 240 may execute a policy based on determining whether a threshold amount of different protocol fields, associated with the network traffic, include random text. In some implementations, network security device 240 may execute a policy on the network traffic if the amount of malicious network traffic intended for server device 220 exceeds a threshold.

As further shown in FIG. 6, process 600 may include updating the data structure based on the candidate text (block 690). For example, network security device 240 may update the data structure based on the candidate text. In some implementations, network security device 240 may update the data structure by adding clean candidate text (e.g., candidate text that has been determined to not include random text) to the model text. Additionally, or alternatively, network security device 240 may update the data structure by determining and/or updating frequencies using the clean candidate text. For example, when network traffic includes clean candidate text, network security device 240 may update the data structure by treating the clean candidate text as model text and performing one or more operations described herein in connection with FIG. 4.

Network security device 240 may improve the accuracy of the model that detects random text in candidate text by updating the data structure based on the candidate text (e.g., because network threats and typical candidate fields associated with benign network traffic may evolve). That is, network security device 240 may improve detection of evolving network threats if the model used by network security device 240 is context-aware because of updates from live network traffic.

In this way, network security device 240 may classify and/or route network traffic based on using a probability-based model that detects random content in a protocol field associated with the network traffic. Implementations described herein may improve accuracy of classification by training the model using a large amount of model text (e.g., millions or billions of example entries associated with the protocol field), may enable detection of evolving network threats by training the model using live network traffic, and may improve the efficiency of classification by using an efficient Markov chain process.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
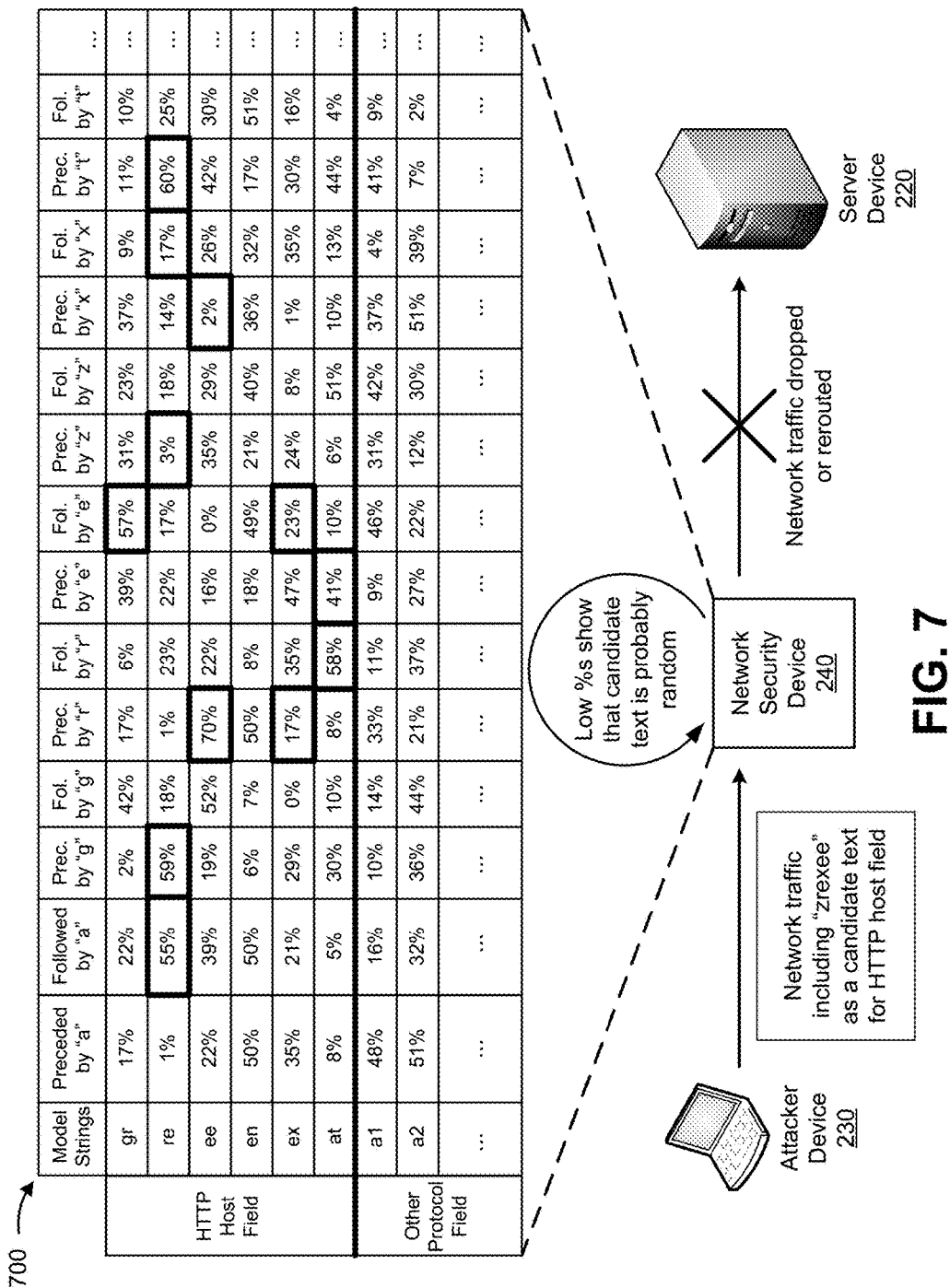
FIGS. 7 and 8 are diagrams of example implementations relating to the example process shown in FIG. 6.

FIG. 7 is a diagram of an example implementation 700 relating to example process 600 shown in FIG. 6. FIG. 7 shows an example of classifying and/or routing network traffic using a probability-based model that detects random content in a protocol field associated with the network traffic.

As shown in FIG. 7, assume that implementation 700 includes a server device 220, an attacker device 230, a network security device 240, and a data structure stored by network security device 240. Assume that network security device 240 is in communication with server device 220. Assume further that network security device 240 is in communication with attacker device 230. Assume further that network security device 240 is in a position to receive any network traffic that attacker device 230 sends towards server device 220.

As shown, network security device 240 receives network traffic. For the purpose of FIG. 7, assume that the operations described herein in connection with FIGS. 5A and 5B have been performed. Network security device 240 reads candidate text associated with the HTTP host field associated with the network traffic (e.g., as shown, the candidate text is "zrexee"). Network security device 240 identifies a set of candidate strings included in the candidate text (e.g., "zr," "re," "ex," "xe," and "ee"). Network security device 240 determines whether a candidate string, of the set of candidate strings, is included in model text stored by the data structure (e.g., the data structure stored by network security device 240 as described above in connection with process 400). To determine whether a candidate string is included in the model text, network security device 240 looks up whether the candidate string matches a model string. Network security device 240 determines that "zr" is not included in the model text, that "re" is included in the model text, that "ex" is included in the model text, that "xe" is not included in the model text, and that "ee" is included in the model text. Since some candidate strings are included in the model text, while others are not, network security device 240 cannot determine with sufficient certainty whether the candidate text includes random text, and network security device 240 does some additional processing.

Network security device 240 identifies one or more characters that precede or follow the candidate string in the candidate text (e.g., network security device 240 identifies that "zr" is followed by "e," that "re" is preceded by "z" and followed by "x," that "ex" is preceded by "r" and followed by "e," and so on). Network security device 240 determines a frequency with which one or more characters precede or follow the candidate string in the model text. Network security device 240 looks up the frequency associated with each candidate string that is present in the model text (e.g., as shown by thickly shaded boxes in the data structure). Network security device 240 determines that "re" is preceded by "z" at a frequency of 3%, that "re" is followed by "x" at a frequency of 17%, that "ex" is preceded by "r" at a frequency of 17%, that "ex" is followed by "e" at a frequency of 23%, and that "ee" is preceded by "x" at a frequency of 2%.

Network security device 240 determines, using the model, that there is a 60% probability that candidate text includes random text based on the fact that two out of five candidate strings are not included in the model text, and based on the fact that frequencies associated with candidate strings are relatively low (e.g., at 23% or below). Assume that the threshold probability is 50%. Network security device 240 determines that candidate text includes random text because the threshold probability has been satisfied (e.g., 60% is higher than the 50% threshold probability). Low frequencies indicate that the candidate text does not include typical text associated with the protocol field and that the candidate text includes random text typically associated with malicious network traffic. Network security device 240 determines that the network traffic is malicious network traffic originating from an attacker device 230.

Network security device 240 blocks the network traffic (e.g., prevents the network traffic from reaching server device 220) associated with the candidate text because the network traffic is malicious. In this way, network security device 240, using a probability-based model that detects random content, may protect server device 220 from malicious network attacks originating from attacker devices 230.

As indicated above, FIG. 7 is provided merely as an example. Other examples are possible and may differ from what was described with regard to FIG. 7.

Figure 8:
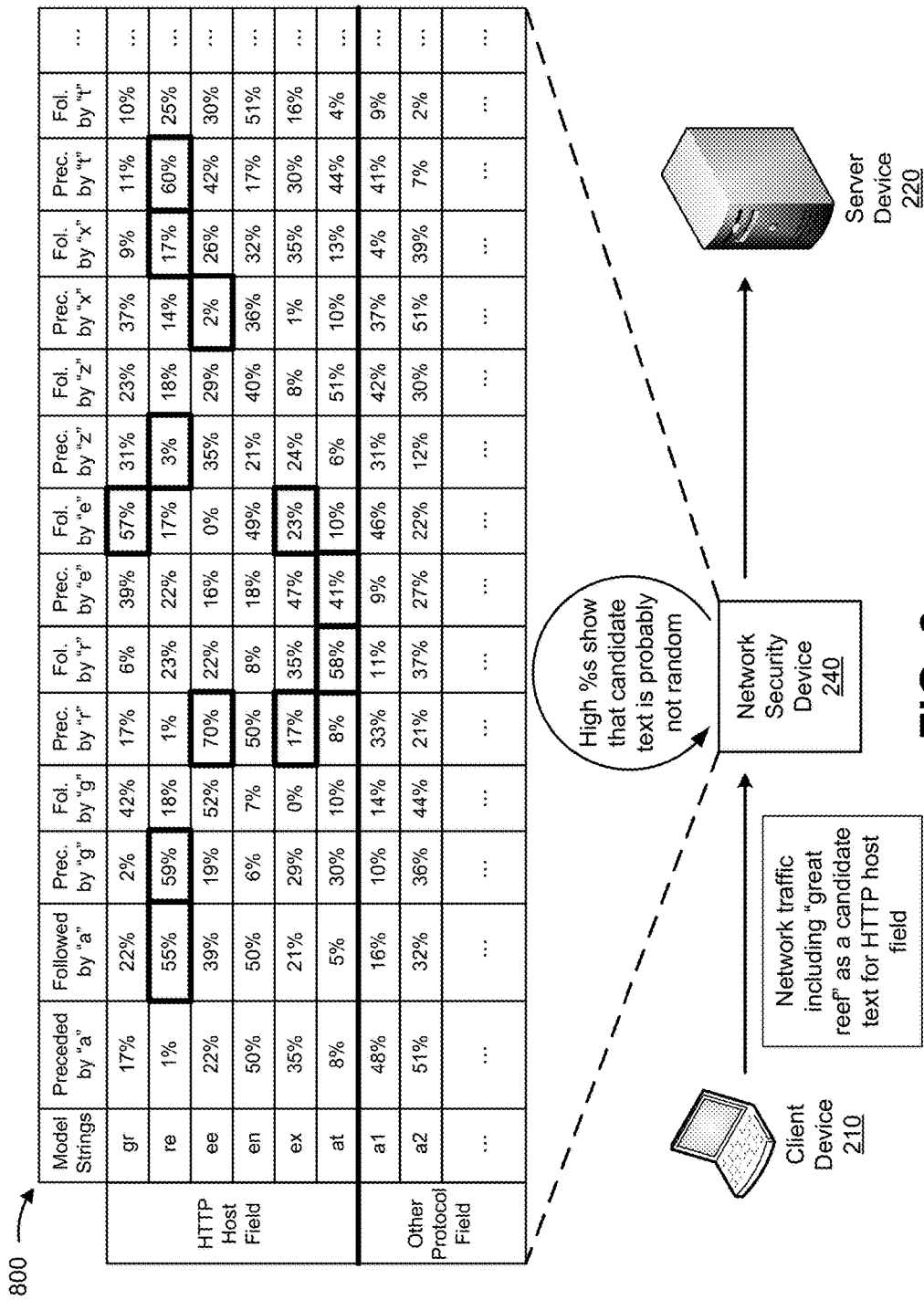

FIG. 8 is a diagram of an example implementation 800 relating to example process 600 shown in FIG. 6. FIG. 8 shows an example of classifying and/or routing network traffic based on using a probability-based model that detects random content in a protocol field associated with the network traffic.

As shown in FIG. 8, assume that implementation 800 includes a client device 210, a server device 220, a network security device 240, and a data structure stored by network security device 240. Assume that network security device 240 is in communication with server device 220. Assume further that network security device 240 is in communication with client device 210. Assume further that network security device 240 is in a position to receive any network traffic that client device 210 sends towards server device 220.

As shown, network security device 240 receives network traffic. For the purpose of FIG. 8, assume that the operations described herein in connection with FIGS. 5A and 5B have been performed. Network security device 240 reads candidate text associated with the HTTP host field associated with the network traffic (e.g., as shown, the candidate text is "great reef"). Network security device 240 identifies a set of candidate strings included in the candidate text (e.g., "gr," "re," "ea," "at," and so on). Network security device 240 determines whether a candidate string, of the set of candidate strings, is included in model text stored by the data structure (e.g., the data structure stored by network security device 240, as described above in connection with process 400). To determine whether a candidate string is included in the model text, network security device 240 looks up whether the candidate string matches a model string. Assume that network security device 240 determines that all candidate strings of the set of candidate strings match a model string. Since network security device 240 was not able to detect random text by matching candidate strings to model strings, assume that network security device 240 goes on to perform the rest of process 600. In some cases, network device 240 may determine that the candidate text is non-random based only on the fact that all candidate strings of the set of candidate strings match a model text.

Network security device 240 identifies one or more characters that precede or follow the candidate string in the candidate text (e.g., network security device 240 identifies that "gr" is followed by "e," that "re" is preceded by "g" and followed by "a," that "ea" is preceded by "r" and followed by "t," and so on). Network security device 240 determines a frequency with which the one or more characters precede or follow the candidate string in the model text. Network security device 240 looks up the frequency associated with each candidate string that is present in the model text (e.g., as shown by thickly shaded boxes in the data structure). As shown, network security device 240 determines that "gr" is followed by "e" at a frequency of 57%, that "re" is preceded by "g" at a frequency of 59% and followed by "a" at a frequency of 55%, and so on. Assume that network security device 240 determines that all the candidate strings are associated with frequencies that are approximately 45% or higher.

Network security device 240 determines, using the probability-based model, that the probability that the candidate text includes random text is 0.01% based on the fact that all candidate strings are included in the model text and based on the fact that frequencies associated with candidate strings are relatively high (e.g., 45% or higher). High frequencies indicate that the candidate text includes clean text typically associated with the protocol field of benign network traffic. Assume that the threshold probability is 50%. Network security device 240 determines that candidate text does not include random text because the threshold probability has not been satisfied (e.g., 0.01% is not higher than the 50% threshold probability). Network security device 240 determines that the network traffic is benign network traffic originating from a client device 210.

Network security device 240 allows the network traffic to reach server device 220 because the candidate text associated with the network traffic indicates that the network traffic is benign. In this way, network security device 240, using the probability-based model that detects random content, may protect server device 220 by allowing benign network traffic originating from client devices 210 to reach server device 220.

As indicated above, FIG. 8 is provided merely as an example. Other examples are possible and may differ from what was described with regard to FIG. 8.

Implementations described herein may assist in classifying network traffic as benign or malicious using a probability-based model to detect random content in a protocol field associated with the network traffic. Implementations described herein may improve accuracy of classification, may enable detection of evolving network threats, and may improve the efficiency of the classification mechanism.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive network traffic;
identify candidate text included in a communication protocol field associated with the network traffic;
identify a set of candidate strings included in the candidate text;
determine whether a candidate string, of the set of candidate strings, matches a model string,
the model string being included in a model text associated with the communication protocol field,
the model text being stored in a data structure;
identify a set of characters that precedes or follows the candidate string in the candidate text;
determine, using the data structure, a frequency with which the set of characters precedes or follows the candidate string;
determine whether the candidate text includes random text based on determining whether the candidate string matches the model string or based on the frequency; and
execute a policy to perform an action on the network traffic based on determining whether the candidate text includes random text.

2. The device of claim 1, where the set of characters is a first set of characters; and
where the one or more processors are further to:
receive the model text;
identify a set of model strings included in the model text;
determine the frequency with which a second set of characters precedes or follows the set of model strings; and
store, in the data structure, the set of model strings, and the frequency with which the second set of characters precedes or follows the set of model strings.

3. The device of claim 1, where the one or more processors, when determining whether the candidate text includes random text, are further to:
determine whether the frequency satisfies a threshold; and
determine whether the candidate text includes random text based on determining whether the frequency satisfies the threshold.

4. The device of claim 1, where the one or more processors, when determining whether the candidate text includes random text, are further to:
determine a probability that the candidate text includes random text based on determining whether the candidate string matches the model string or based on the frequency;
determine whether the probability satisfies a threshold; and
determine whether the candidate text includes random text based on determining whether the probability satisfies the threshold.

5. The device of claim 1, where the set of characters is a first set of characters; and
where the one or more processors are further to:
identify the model text from live network traffic,
the live network traffic being received from a live network deployment;
identify a set of model strings included in the model text;
determine a frequency with which a second set of characters precedes or follows the set of model strings; and
store, in the data structure, the set of model strings and the frequency with which the second set of characters precedes or follows the set of model strings.

6. The device of claim 1, where the set of characters is a first set of characters; and
where the one or more processors are further to:
determine that the candidate text does not include random text;
update the model text using the candidate text based on determining that the candidate text does not include random text;
identify a set of model strings included in the model text;
determine a frequency with which a second set of characters precedes or follows the set of model strings; and
store, in the data structure, the set of model strings, and the frequency with which the second set of characters precedes or follows the set of model strings.

7. The device of claim 1, where the one or more processors, when identifying the candidate text included in the communication protocol field, are further to:
receive a list of fields from which the candidate text is to be read; and
read the candidate text based on the list of fields.

8. A method, comprising:
receiving, by a device, network traffic;
identifying, by the device, candidate text included in a communication protocol field associated with the network traffic;
identifying, by the device, a set of candidate strings included in the candidate text;
determining, by the device, whether a candidate string, of the set of candidate strings, is included in a data structure,
the data structure storing model text associated with the communication protocol field;
identifying, by the device, a set of characters that precedes or follows the candidate string in the candidate text;
determining, by the device and using the data structure, a frequency with which the set of characters precedes or follows the candidate string;
determining, by the device, whether the candidate text includes random text based on determining whether the candidate string is included in the data structure or based on the frequency; and
performing, by the device, an action on the network traffic based on determining whether the candidate text includes random text.

9. The method of claim 8, where the set of characters is a first set of characters; and
where the method further comprises:

receiving the model text associated with the communication protocol field;
identifying a set of model strings included in the model text;
determining a frequency with which a second set of characters precedes or follows the set of model strings; and
storing, in the data structure, the set of model strings and the frequency with which the second set of characters precedes or follows the set of model strings.

10. The method of claim 8, where the candidate string, of the set of candidate strings, is n characters in length and is included in an n-gram sequence of the candidate text,
n being an integer greater than or equal to one; and
where a model string, included in the model text, is n characters in length and is included in an n-gram sequence of the model text.

11. The method of claim 8, where determining whether the candidate text includes random text further comprises:
determining whether a threshold quantity or proportion of candidate strings are absent from the model text; and
determining whether the candidate text includes random text based on determining whether the threshold quantity or proportion of candidate strings are absent from the model text.

12. The method of claim 8, where determining whether the candidate text includes random text further comprises:
calculating a score by applying weights to frequencies with which the set of characters precedes or follows one or more candidate strings, of the set of candidate strings;
determining whether the score satisfies a threshold; and
determining whether the candidate text includes random text based on determining whether the score satisfies the threshold.

13. The method of claim 8, where determining whether the candidate text includes random text further comprises:
determining whether the candidate string, of the set of candidate strings, is included in the data structure; and
determining whether the candidate text includes random text based on determining whether the candidate string is included in the data structure.

14. A computer-readable medium storing instructions, the instructions comprising:
one or more instructions that, when executed by one or more processors, cause the one or more processors to:
receive network traffic;
identify candidate text included in a protocol field associated with the network traffic;
identify a set of candidate strings included in the candidate text;
identify a set of characters that precedes or follows a candidate string, of the set of candidate strings, in the candidate text;
determine, using a data structure, a frequency with which the set of characters precedes or follows the candidate string;
determine whether the candidate text includes random text based on the frequency; and
perform an action on the network traffic based on determining whether the candidate text includes random text.

15. The computer-readable medium of claim 14, where the one or more instructions, when executed by the one or more processors, further cause the one or more processors to:
determine whether the candidate string matches a model string,
the model string being included in a model text associated with the protocol field,
the model text being stored in the data structure; and
determine whether the candidate text includes random text based on determining whether the candidate string matches the model string.

16. The computer-readable medium of claim 14, where the set of characters is a first set of characters; and
where the one or more instructions, when executed by the one or more processors, further cause the one or more processors to:
receive model text;
identify a set of model strings included in the model text;
determine a frequency with which a second set of characters precedes or follows the set of model strings; and
store, in the data structure, the set of model strings and the frequency with which the second set of characters precedes or follows the set of model strings.

17. The computer-readable medium of claim 14, where the candidate string, of the set of candidate strings, is n characters in length and is included in an n-gram sequence of the candidate text,
n being an integer greater than or equal to one; and
where a model string is n characters in length and is included in an n-gram sequence of model text.

18. The computer-readable medium of claim 14, where the set of characters is a first set of characters; and
where the one or more instructions, when executed by the one or more processors, further cause the one or more processors to:
determine that the candidate text does not include random text;
update model text using the candidate text based on determining that the candidate text does not include random text;
identify a set of model strings included in the model text;
determine a frequency with which a second set of characters precedes or follows the set of model strings; and
store, in the data structure, the set of model strings and the frequency with which the second set of characters precedes or follows the set of model strings.

19. The computer-readable medium of claim 14, where the set of characters is a first set of characters; and
where the one or more instructions, when executed by the one or more processors, further cause the one or more processors to:
identify model text from live network traffic,
the live network traffic being received from a live network deployment;
identify a set of model strings included in the model text;
determine a frequency with which a second set of characters precedes or follows the set of model strings; and
store, in the data structure, the set of model strings and the frequency with which the second set of characters precedes or follows the set of model strings.

20. The computer-readable medium of claim 14, where the one or more instructions, that cause the one or more processors to determine whether the candidate text includes random text, further cause the one or more processors to:
determine whether the frequency satisfies a threshold; and determine whether the candidate text includes random text based on determining whether the frequency satisfies the threshold.

\* \* \* \* \*